UNITED STATES PATENT OFFICE.

REINHOLD GRÜTER, OF CHARLOTTENBURG, GERMANY, ASSIGNOR TO CHEMISCHE WERKE VORM. DR. HEINRICH BYK, OF CHARLOTTENBURG, GERMANY, A CORPORATION OF GERMANY.

PROCESS OF MAKING STABLE CALCIUM PERBORATE.

999,497.      Specification of Letters Patent.      Patented Aug. 1, 1911.

No Drawing.      Application filed March 14, 1911. Serial No. 614,443.

*To all whom it may concern:*

Be it known that I, REINHOLD GRÜTER, a subject of the German Emperor, and resident of Charlottenburg, in the Empire of Germany, have invented certain new and useful Improvements in Processes of Making Stable Calcium Perborates, of which the following is a specification.

According to the "*Berichte der Deutschen Chemischen Gesellschaft*," 31,954, a calcium perborate is formed when sodium perborate is decomposed by calcium chlorid. This calcium perborate was, however, so unstable that it could not be analyzed. Further, in the specification of German Patent No. 165,278 also (paragraph 1) the calcium perborate is stated to be very unstable as compared with other perborates. I have found in fact that such unfavorable results are obtained when calcium chlorid is caused to act on sodium perborate in the usual way in the manner set out in these references. When for example a concentrated solution of sodium perborate is converted with the equivalent quantity of calcium chlorid, the precipitated calcium perborate contains about 45% of the active oxygen employed. The calcium perborate thus obtained was found, after drying, to have an average oxygen content of 8.5%. 30 per cent. of the active oxygen employed had remained behind in the mother liquor, the remainder, 26 per cent., had disappeared as inactive oxygen. On the other hand I have found by experiments that calcium perborate can be prepared in a practical way and avoiding the previous drawbacks, when the calcium perborate is protected as far as possible from hydrolysis on its formation. This result is attained by working in the presence of little water or with such other diluents which are known to have a restraining effect upon hydrolysis. When for example a calcium salt is dissolved in very little water, the solution warmed, and solid crystallized sodium perborate added to the concentrated solution, the known reaction at once occurs. A precipitate of calcium perborate is at once formed and sodium chlorid is produced. The calcium perborate is formed in clots or lumps and may with advantage be ground up again with the whole reaction mass in order that inclosed particles may be subjected to the reaction. The perborate may also be added mixed with water.

When the quantity of water used is sufficient for permitting the sodium chlorid formed to go into solution, the calcium perborate is drained by suction and so thereby freed from the sodium chlorid solution. It is possible, however, to work with less water, and even to limit this to the water of crystallization. In this case, after completion of the reaction and cooling, sufficient water has to be added to bring all the sodium chlorid into solution; the precipitate is then drained by suction and washed with water. With this method of working, the conversion may with advantage be carried out in ball mills.

When the calcium perborate is actually formed, it is much less sensitive to water and it can therefore be mixed with an ample quantity of water for dissolving out the sodium chlorid. It appears therefore that it is only during the actual formation of the calcium perborate that the water exerts an essentially hydrolytic action.

It is not necessary to start with ready formed alkali perborate. I can also employ substances which yield alkali perborates, *e. g.* hydrogen peroxid plus alkali borate, or alkali superoxid plus boric acid plus mineral acid. In general, all those substances may be considered from which perborates may be produced in the well known manner. As sodium perborate itself is rather insoluble it is of advantage to carry out the reaction at a raised temperature.

The result attained by the present invention was not to be foreseen from the literature on the subject, since according thereto only an unstable calcium perborate is obtained which could not even be analyzed. Further, from the publication to a similar effect in the *Comptes Rendus* 140,508, where it is likewise stated that sodium perborate is converted by calcium salt into a calcium perborate varying in composition according to the dilution, the present smooth reaction was not to be foreseen, the less so as the very heat which is of advantage with the process of the present invention decomposes the perborates according to the latter publication (see page 507, lines 2 and 3).

The reaction need not necessarily be carried out with equivalent quantities, but the salt can be employed in excess, in this case it goes into the mother liquor on filtration.

Example: 11 parts (½ molecule) of crystallized calcium clorid are dissolved in 10 parts of water and heated to 50–60° C. To this solution are added 15.4 parts (1 molecule) of commercial sodium perborate. Calcium perborate separates out in clots or lumps. The temperature is kept at 50–60° C. and the mass is ground up until a homogeneous paste is formed. The mass is then allowed to cool and 5 parts of cold water are added. After standing for a while the calcium perborate is drained by suction and washed with a small quantity of water. On drying in the air, a product is obtained which contains about 12.3% of active oxygen. The quantity amounts to about 11 parts by weight. The oxygen yield is about 90%. In this example 9.5 per cent. of the active oxygen was still found to be present in the mother liquor, so that in this case only 0.5% was lost in the process. The mother liquor can be used again as a solvent on another batch of material. When the process is carried out with more water, the yield of calcium perborate is smaller, while when less water is taken the yield is higher. The calcium perborate thus obtained is distinguished by a high oxygen content and is extremely suitable for bleaching purposes, as it withstands boiling with water much better than sodium perborate.

The essence of the present process consists in the fact that the hydrolytic action of the water during the formation of the calcium perborate is restrained or in other words, that water in quantity insufficient to cause any material amount of hydrolytic action on the calcium-perborate is employed during the reaction. This can be attained not only in the way described by reducing the quantity of water, but also by diluents, which have the property of reducing or restraining the hydrolytic action of the water during the reaction.

I claim:

1. The process herein described of producing stable perborates, which consists in subjecting an alkali perborate to the action of a calcium salt in the presence of water insufficient in quantity to cause any material amount of hydrolytic action during the reaction.

2. The process herein described of producing stable calcium perborates which consists in subjecting sodium perborates to the action of calcium chlorid in the presence of water insufficient in quantity to cause any material amount of hydrolytic action during the formation of the calcium perborate.

3. The process herein described of producing stable perborates, which consists in subjecting an alkali-perborate to the action of a calcium salt in the presence of water insufficient in quantity to cause any material amount of hydrolytic action during the reaction, grinding the clots or lumps of the perborate formed by the reaction, separating the perborate from the mother-liquor and washing the perborate with water.

4. The process herein described of producing stable calcium perborates, which consists in subjecting sodium perborate to the action of calcium chlorid in the presence of water insufficient in quantity to cause any material amount of hydrolytic action, reducing the clots or lumps of the calcium perborate formed by the reaction by grinding, separating the calcium perborate from the mother-liquor, and lastly, washing the same with water.

In testimony, that I claim the foregoing as my invention, I have signed my name in presence of two subscribing witnesses.

REINHOLD GRÜTER.

Witnesses:
PAUL SCHULTZE,
MAX MAETSCHKE.